United States Patent Office.

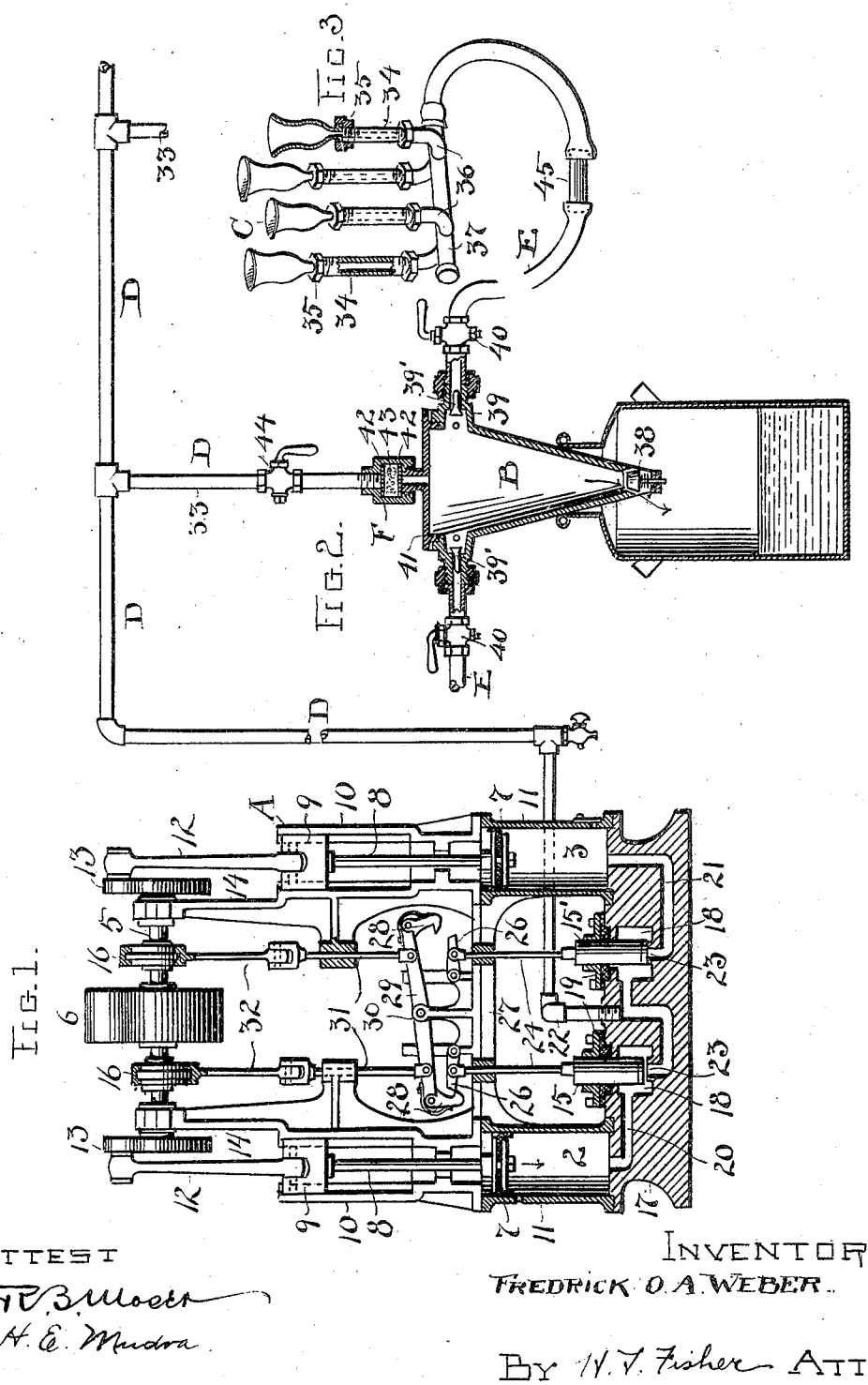

FREDRICK O. A. WEBER, OF CLEVELAND, OHIO.

COW-MILKING APPARATUS.

SPECIFICATION forming part of Letters Patent No. 680,952, dated August 20, 1901.

Application filed February 25, 1901. Serial No. 48,702. (No model.)

*To all whom it may concern:*

Be it known that I, FREDRICK O. A. WEBER, a citizen of the United States, residing at Cleveland, in the county of Cuyahoga and State of Ohio, have invented certain new and useful Improvements in Cow-Milking Apparatus; and I do declare that the following is a full, clear, and exact description of the invention, which will enable others skilled in the art to which it appertains to make and use the same.

My invention relates to improvements in cow-milking apparatus; and the improvement consists in an apparatus constructed and arranged to draw milk from the teats of one or more cows by suction and to force said milk when drawn into a suitable receiving vessel, all substantially as hereinafter described, and more particularly pointed out in the claims.

Referring to the drawings, Figure 1 is a sectional elevation of the suction and force pumps. Fig. 2 is a sectional view of the valved milk receiving and discharging vessel. Fig. 3 is a perspective view of a set of teat-cups and their removable and interchangeable supporting-stems. These several views are shown connected in operative relations as if in a single figure.

The apparatus as a whole comprises a combined suction and force pump A, the milk receiving and discharging vessel B, teat-cups C, mounted and arranged in sets of four to attach to a cow's teats, air-line connections D from pump A to vessel B, and the separate valved pipe connections E from vessel B to the teat-cup C, and an air strainer or filter F in the line of pipe D.

Pump A comprises a suction or vacuum pump 3 and an air-pressure or force pump 2, and the operating members for each pump are in duplicate and act alike and are driven from a common shaft 5, having a power-pulley 6 thereon. Each pump is provided with a piston 7, having a rigid connecting-rod 8, which is fastened to a slide-head 9 and guides 10 for each head, supported upon the pump-cylinder 11. Pitman 12 connects head 9 with the wrist-pin of an eccentric 13, fastened upon opposite ends of power-shaft 5, and when this shaft is rotated by means of the centrally-located pulley 6 both pistons rise and fall together. Shaft 5 is supported in bearings at the top of upright arms 14, which form part of the guide-supports, and a set of weighted valves 15 and 15' are located at the base 17 opposite their respective pumps 2 and 3 and have operative connections with eccentrics 16 on shaft 5. Valves 15 and 15' are separately supported to move in a vertical line within separate chambers 18 above valve-seats 23. Air-passages 20 and 21 lead from pumps 2 and 3, respectively, to the single pipe-line 22, which taps into base 17 and into open communication with said passages at a point midway said valves and their chambers. The valves operate to open and close said passages alternately from one pump to the other to the pipe-line. A packing-ring 19 is bolted on base 17 to make an air-tight support for the valves 15 and 15' to slide up and down therein.

The connections for valves 15 and 15', which lead up to each eccentric 16, consist of a link 24 for each valve, which connects with a short arm 26, pivoted on rigid frame 27. The end of each arm 26 is arranged to engage a pivoted and beveled spring-pressed catch 28, which is located at the extreme end of a rock-arm 29, pivotally supported at its center on a standard 30 of frame 27. A sliding rod 31, supported to slide in an extension of the upright standard 14, connects rock-arm 29 with a pitman-rod 32, which is operatively engaged with eccentrics 16. Valves 15 and 15' are alternately raised by the eccentrics 16 when catches 28 engage and raise pivoted arms 26. Only one of said valves is raised at a time. As the end of arm 29 and the catch thereon reaches a certain height arm 26 is released and the valve falls by its own weight. The opposite end of rock-arm 29 at the other side of its center has lowered its catch at this time, so that one valve is in position to be immediately carried up after the other valve has been dropped and closed. These movements are timed through the eccentric connections to raise one valve and open the passage from one pump to pipe-line 22 immediately upon the dropping of the other valve and closing of the passage leading from the other pump.

Pump 2 is designed to force air into the pipe-line when its valve 15 is raised and its piston 7 is traveling downward. Pump 3 creates a suction when its piston 7 is traveling up and its valve 15' is raised and passage 21 open. The pipe-line 22 leads off to one side of the pump and to any distance or point desired and has connecting-pipes 33, which support the milk receiving and discharging vessel B. As many of these pipe connections and vessels B can be arranged along the line of pipe 22 as may be needed, the vessel B being arranged, as here shown, to connect up with two cows through the milk-pipe lines E, arranged one at each side, although more of such lines could be run from the same vessel, if desired. The teat-cups C are arranged in sets of four and connected up with pipe-line E. The cups C are preferably of soft rubber and in the form of a teat. They are mounted at the top upon short hard-rubber or glass tubes 34 and are fastened in place by a screw-nut 35. Tubes 34 are screwed into the ends of curved elbows 36, which form an integral part of a hollow body 37, to which pipe E is removably attached. Tubes of various lengths and having central openings of greater or less diameter are provided in such numbers so that an interchange of one size tube for another can be made when desired.

As is well known, the milk obtained from one or the other of the teats of the cow varies, and in order to provide for the proper amount of suction, as well as milk-carrying space, these tubes 34 are preferably made removable and interchangeable and of different diameters to comply with these varying conditions. The tubes are also made of different lengths, so that there is provision for an adjustment in fastening the cup C in place upon teats that are located at different elevations.

The milk receiving and discharging vessel B has an inverted-conical-shaped body having a spring-pressed self-seating valve 38 at its bottom point. The body is preferably made in this form, so that it can be set or placed and supported in position in cans or pails having openings of different shapes and sizes and which cans ultimately receive the milk.

Connection with pipes E is made through extensions 39 at the top of vessel-body B, and puppet-valves 39' are located and contained within these extensions in the passage communicating with the pipe E to open and close automatically, according as the suction and pressure action of pumps 3 and 2, respectively, is brought into play.

A valve 40 is placed in the line of each pipe E to shut off the line of pipe which is not in use. The vessel-body B is provided at its top with a cover 41, which screws into place and has a gasket-ring or packing between the flange of said cover and the top edge of the body. Cover 41 has a screw extension with a passage therein which is screwed into filter F. This filter is attached to the bottom of pipe 33 and contains perforated disks 42 and filtering material 43 between the disks, all in the line of the air-passage. The object of this filter is to take up whatever oil and impurities that may gather from the pump and in the line of pipe 22 and prevent the same from being forced into the milk-receiving vessel B and which would otherwise be forced out with the milk to its detriment. A valve 44 is located in the line of pipe 33 in order to regulate the amount of suction and pressure, as well as to shut off the same entirely, if desired.

Pipe connections E are provided with a glass or other transparent tube 45, or tubes 34 could be transparent, through which the milk is obliged to pass on its way to vessel B, and with its use the operator is enabled to tell when to close valve 40. This could be done as soon as it is apparent that no more milk is being received from that particular cow in order that no strain or possible injury to the cow may result.

The advantage of milking cows with an apparatus of this kind consists in the time saved, as well as the purity and cleanliness of the milk obtained over the usual hand method now practiced.

The cups and their connected parts are placed bodily in a cleansing solution after use, and the solution is drawn through pipe E into vessel B until thorough cleansing of all said parts has been accomplished.

What I claim is—

1. In a milking apparatus, the combination of a pressure and vacuum pump, a milk-receiving vessel having air-line connections with said pump, teat-cups for the cow and milk connections leading from said teat-cups to said vessel, self-seating valves in said milk connections adapted to close against the pressure from said pump, and a discharge-opening for said vessel provided with a self-closing valve adapted to close when vacuum is on from said pump, substantially as described.

2. In a milking apparatus, the combination of a vacuum and pressure pump, a milk-receiving vessel, teat connections to said vessel, air connections between said pump and vessel, and an air-strainer in the line of said air connections, substantially as described.

3. In a milking apparatus, the vacuum and air-pressure pump in combination with a set of teat-cups for the cow having air and milk pipe connections with said pump, a milk-receiving vessel open to said line of pipe connections, and interchangeable air and milk controlling members for said teat-cups, substantially as described.

4. In a milking apparatus, a combined vacuum and pressure pump, a milk receiving and discharging vessel having pipe connection with said pump, and a plurality of teat-cups and pipe connections therefor leading separately and independently from said vessel and having automatic controlling-valves to open and close said teat-pipe connections when suction and pressure is alternately on from said pump, substantially as described.

Witness my hand to the foregoing specification this 5th day of February, 1901.

FREDRICK O. A. WEBER.

Witnesses:
R. B. MOSER,
JOSEPH PIESHULTOR.